US010970733B2

(12) United States Patent
Yang et al.

(10) Patent No.: US 10,970,733 B2
(45) Date of Patent: Apr. 6, 2021

(54) SYSTEMS AND METHODS FOR COUPON ISSUING

(71) Applicant: BEIJING DIDI INFINITY TECHNOLOGY AND DEVELOPMENT CO., LTD., Beijing (CN)

(72) Inventors: Wenjun Yang, Beijing (CN); Zang Li, Beijing (CN); Sixu Li, Beijing (CN); Shi Cheng, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/941,511

(22) Filed: Jul. 28, 2020

(65) Prior Publication Data
US 2020/0357013 A1 Nov. 12, 2020

Related U.S. Application Data

(63) Continuation of application No. PCT/CN2019/083283, filed on Apr. 18, 2019.

(30) Foreign Application Priority Data

Apr. 20, 2018 (CN) .......................... 201810361113.2

(51) Int. Cl.
G06Q 30/02 (2012.01)
G06F 16/9035 (2019.01)
(Continued)

(52) U.S. Cl.
CPC ..... *G06Q 30/0224* (2013.01); *G06F 16/9035* (2019.01); *G06K 9/6256* (2013.01);
(Continued)

(58) Field of Classification Search
CPC ........... G06Q 30/0224; G06Q 30/0211; G06Q 30/0208; G06N 20/00; G06K 9/6256; G06F 16/9035
(Continued)

(56) References Cited

U.S. PATENT DOCUMENTS

2018/0012246 A1  1/2018 Kamarei

FOREIGN PATENT DOCUMENTS

CN  104200378 A  12/2014
CN  106846041 A   6/2017
(Continued)

OTHER PUBLICATIONS

Guangmo Tong, Coupon Advertising in Online Social Systems: Algorithms and Sampling Techniques, 2018 (Year: 2018).*
(Continued)

*Primary Examiner* — Tarek Elchanti
(74) *Attorney, Agent, or Firm* — Metis IP LLC

(57) ABSTRACT

A method for issuing coupons to a plurality of target users is provided. For each of the plurality of target users, the method may include determining a predicted value of a group indicator of the target user in a predetermined period. The method may further include grouping the plurality of target users using a plurality of grouping strategies. For each of the grouping strategies, the method may further include determining a candidate coupon issuing strategy. For each of the candidate coupon issuing strategies, the method may further include obtaining user feature information of one or more target users in each group corresponding to the candidate coupon issuing strategy. For each of the candidate coupon issuing strategies, the method may further include predicting an ROI of the candidate coupon issuing strategy based on an RO prediction model and the corresponding user feature information.

15 Claims, 8 Drawing Sheets

(51) Int. Cl.
*G06N 20/00* (2019.01)
*G06K 9/62* (2006.01)

(52) U.S. Cl.
CPC ......... *G06N 20/00* (2019.01); *G06Q 30/0208* (2013.01); *G06Q 30/0211* (2013.01)

(58) Field of Classification Search
USPC ..................................................... 705/14.25
See application file for complete search history.

(56) References Cited

FOREIGN PATENT DOCUMENTS

| | | | |
|---|---|---|---|
| CN | 107194717 A | 9/2017 | |
| CN | 107451869 A | 12/2017 | |
| WO | WO-2006099105 A2 * | 9/2006 | ......... G06F 16/3325 |

OTHER PUBLICATIONS

International Search Report in PCT/CN2019/083283 dated Jul. 17, 2019, 4 pages.
Written Opinion in PCT/CN2019/083283 dated Jul. 17, 2019, 5 pages.

* cited by examiner

SYSTEMS AND METHODS FOR COUPON ISSUING

CROSS-REFERENCE TO RELATED APPLICATIONS

This application is a continuation of International Application No. PCT/CN2019/083283, filed on Apr. 18, 2019, which claims priority to Chinese Patent Application No. 201810361113.2, filed on Apr. 20, 2018, the contents of each of which are hereby incorporated by reference.

TECHNICAL FIELD

The present disclosure generally relates to coupon issuing, and in particular, to systems and methods for determining a coupon issuing strategy.

BACKGROUND

Coupons are widely used in marketing and sales to stimulate consumers to purchase products or services. In coupon issuing, an unsuitable coupon issuing strategy may cause an economic loss for an issuer of coupons. It is desirable to develop a suitable and/or customized coupon issuing strategy for a plurality of target users to improve a return on investment (ROI). For example, coupons with different discount amounts may be distributed to different user groups according to one or more user features. Conventionally, a coupon issuing strategy may be selected from a plurality of predetermined coupon issuing strategies according to, for example, prior experience, predicted ROIs of the predetermined coupon issuing strategies, etc. However, in some cases, the selected coupon issuing strategy may be sub-optimal. Therefore, it is desirable to provide effective systems and methods for determining an optimal coupon issuing strategy.

SUMMARY

According to one aspect of the present disclosure, a method for issuing coupons to a plurality of target users is provided. For each of the plurality of target users, the method may include determining a predicted value of a group indicator of the target user in a predetermined period. The method may further include grouping the plurality of target users using a plurality of grouping strategies, each grouping strategy being used to group the plurality of target users into a plurality of groups based on the predicted values of the group indicator of the plurality of target users. For each of the plurality of grouping strategies, the method may further include determining a candidate coupon issuing strategy, the candidate coupon issuing strategy specifying a coupon value for each group corresponding to the grouping strategy. For each of the plurality of candidate coupon issuing strategies, the method may further include obtaining user feature information of one or more target users in each group corresponding to the candidate coupon issuing strategy. For each of the plurality of candidate coupon issuing strategies, the method may further include predicting an ROI of the candidate coupon issuing strategy based on an ROI prediction model and the corresponding user feature information, wherein an input of the ROI prediction model includes the corresponding user feature information. The method may further include determining an optimal coupon issuing strategy for the plurality of target users based on the ROIs of the plurality of candidate coupon issuing strategies using a genetic algorithm.

In some embodiments, the determining a predicted value of a group indicator of each target user in a predetermined period may further include obtaining a group indicator prediction model and historical consumption data of each target user. The determining a predicted value of a group indicator of each target user in a predetermined period may further include, for each target user, determining the predicted value of the group indicator of the target user in the predetermined period based on the group indicator prediction model and the historical consumption data of the target user, wherein an input of the group indicator prediction model includes the historical consumption data of the target user.

In some embodiments, the group indicator prediction model may be generated according to a group indicator prediction model training process. The group indicator prediction model training process may include, for a plurality of sample users, obtaining sample historical consumption data of each sample user in a first historical period and a value of the group indicator of each sample user in a second historical period. The group indicator prediction model training process may further include generating the group indicator prediction model based on the sample historical consumption data and the values of the group indicator of the plurality of sample users.

In some embodiments, the ROI prediction model may be generated based on an ROI prediction model training process. The ROI prediction model training process may include obtaining a plurality of sample coupon issuing strategies, and obtaining sample historical consumption data of a plurality of sample users. The ROI prediction model training process may further include, for each of the plurality of sample coupon issuing strategies, determining, among the plurality of sample users, an experimental group and a control group based on the sample historical consumption data of the plurality of sample users. The ROI prediction model training process may further include for each of the plurality of sample coupon issuing strategies, determining an ROI based on the sample historical consumption data of the corresponding experimental group and the sample historical consumption data of the corresponding control group. The ROI prediction model training process may further include generating the ROI prediction model based on the ROI, sample user feature information of the experimental group, and sample user information of the control group of each sample coupon issuing strategy.

In some embodiments, the generating the ROI prediction model may be based on a gradient boosting decision tree algorithm.

In some embodiments, the group indicator may be at least one of a gross merchandise volume (GMV), a coupon conversion rate, or an abandon rate of coupons.

In some embodiments, the determining an optimal coupon issuing strategy for the plurality of target users may include one or more iterations, and each current iteration of the one or more iteration may include determining whether a termination condition is satisfied in the current iteration. Each current iteration may further include in response to a determination that the termination condition is unsatisfied in the current iteration, updating the plurality of candidate coupon issuing strategies.

Each current iteration may further include, for each of the updated candidate coupon issuing strategies in the current iteration, determining an updated ROI. Each current iteration may further include designating each updated candidate coupon issuing strategy in the current iteration as a candidate coupon issuing strategy in a next iteration, and designating the updated ROI of each updated candidate coupon issuing strategy in the current iteration as an ROI of the corresponding candidate coupon issuing strategy in the next iteration.

In some embodiments, each current iteration may further include in response to a determination that the termination condition is satisfied in the current iteration, designating the candidate coupon issuing strategy with the highest ROI among the plurality of candidate coupon issuing strategies in the current iteration as the optimal coupon issuing strategy.

According to another aspect of the present disclosure, a system for issuing coupons to a plurality of target users may be provided. The system may include at least one storage medium including a set of instructions, and at least one processor in communication with the at least one storage medium. When executing the instructions, the at least one processor may be configured to direct the system to perform the following operations. For each of the plurality of target users, the at least one processor may be configured to direct the system to determine a predicted value of a group indicator of the target user in a predetermined period. The at least one processor may be configured to direct the system to group the plurality of target users using a plurality of grouping strategies, each grouping strategy being used to group the plurality of target users into a plurality of groups based on the predicted values of the group indicator of the plurality of target users. For each of the plurality of grouping strategies, the at least one processor may be configured to direct the system to determine a candidate coupon issuing strategy, the candidate coupon issuing strategy specifying a coupon value for each group corresponding to the grouping strategy. For each of the plurality of grouping strategies, the at least one processor may be further configured to direct the system to obtain user feature information of one or more target users in each group corresponding to the candidate coupon issuing strategy. For each of the plurality of grouping strategies, the at least one processor may be configured to direct the system to predict an ROI of the candidate coupon issuing strategy based on an ROI prediction model and the corresponding user feature information, wherein an input of the ROI prediction model includes the corresponding user feature information. The at least one processor may be configured to direct the system to designate the updated ROI of each updated candidate coupon issuing strategy in the current iteration as an ROI of the corresponding candidate coupon issuing strategy in the next iteration.

According to another aspect of the present disclosure, a system for issuing coupons to a plurality of target users may be provided. The system may include a prediction module, a grouping module, a strategy generation module, an obtaining module, and an optimal strategy determination module. The prediction module may be configured to determine a predicted value of a group indicator of each of the plurality of target users in a predetermined period. The grouping module may be configured to group the plurality of target users using a plurality of grouping strategies, each grouping strategy being used to group the plurality of target users into a plurality of groups based on the predicted values of the group indicator of the plurality of target users. For each of the plurality of grouping strategies, the strategy generation module may be configured to determine a candidate coupon issuing strategy, the candidate coupon issuing strategy specifying a coupon value for each group corresponding to the grouping strategy. For each of the plurality of candidate coupon issuing strategies, the obtaining module may be configured to obtain user feature information of one or more target users in each group corresponding to the candidate coupon issuing strategy. For each of the plurality of candidate coupon issuing strategies, the optimal strategy determination module may be configured to determine, based on an ROI prediction model and the corresponding user feature information, an ROI of the candidate coupon issuing strategy, wherein an input of the ROI prediction model includes the corresponding user feature information. The optimal strategy determination module may also be configured to determine an optimal coupon issuing strategy for the plurality of target users based on the ROIs of the plurality of candidate coupon issuing strategies using a genetic algorithm.

According to still another aspect of the present disclosure, a non-transitory computer-readable storage medium embodying a computer program product is provided. The computer program product comprising instructions for issuing coupons to a plurality of target users may be configured to cause a computing device to perform one or more of the following operations. For each of the plurality of target users, the computing device may further determine a predicted value of a group indicator of the target user in a predetermined period. The computing device may further group the plurality of target users using a plurality of grouping strategies, each grouping strategy being used to group the plurality of target users into a plurality of groups based on the predicted values of the group indicator of the plurality of target users. For each of the plurality of grouping strategies, the computing device may further determine a candidate coupon issuing strategy, the candidate coupon issuing strategy specifying a coupon value for each group corresponding to the grouping strategy. For each of the plurality of grouping strategies, the computing device may further obtain user feature information of one or more target users in each group corresponding to the candidate coupon issuing strategy. For each of the plurality of grouping strategies, the computing device may further determine an ROI of the candidate coupon issuing strategy based on an ROI prediction model and the corresponding user feature information, wherein an input of the ROI prediction model includes the corresponding user feature information. The computing device may further determine an optimal coupon issuing strategy for the plurality of target users based on the ROIs of the plurality of candidate coupon issuing strategies using a genetic algorithm.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
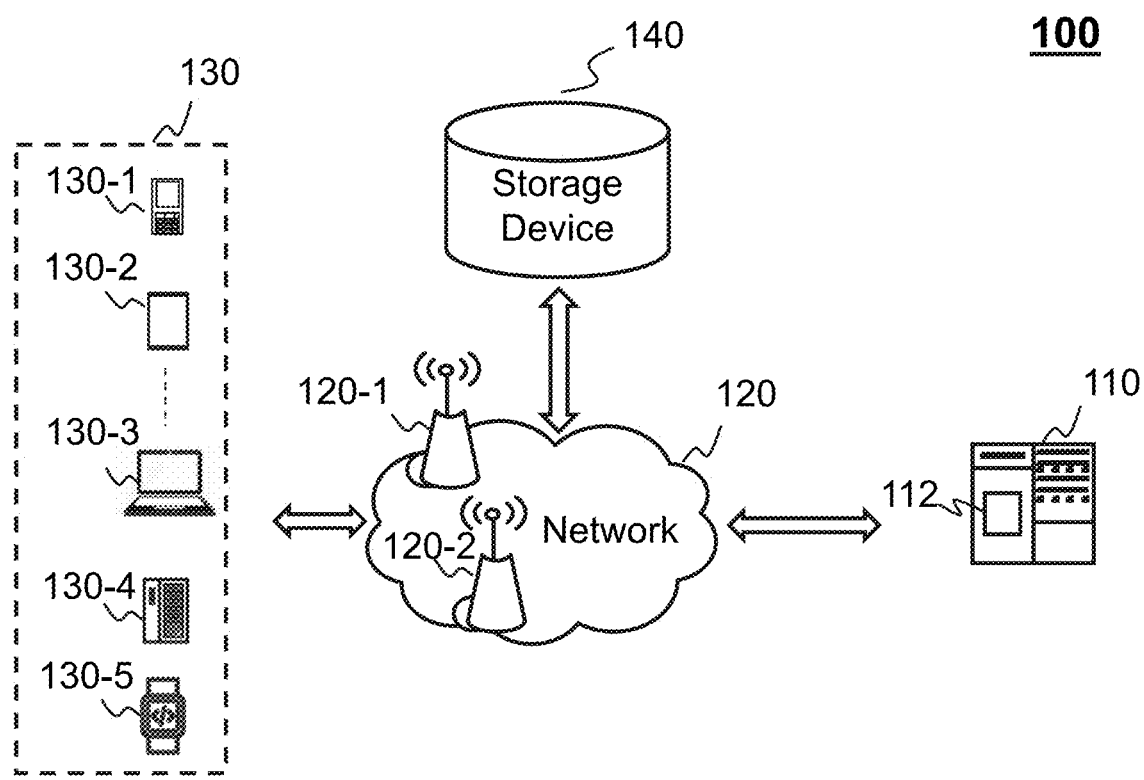
FIG. 1 is a schematic diagram illustrating an exemplary coupon system according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to some embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood that the operations of the flowchart may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for determining an optimal coupon issuing strategy for a plurality of target users. The optimal coupon issuing strategy may refer to a coupon issuing strategy, an ROI (or a predicted ROI) of which reaches a predetermined threshold or be the highest among a plurality of possible coupon issuing strategies. To this end, the systems and methods may determine a predicted value of a group indicator of each target user in a predetermined period. The systems and methods may also group the target users using a plurality of grouping strategies, each grouping strategy being used to group the target users into a plurality of groups based on the predicted values of the group indicator of the of target users. For each grouping strategy, the systems and methods may further determine a candidate coupon issuing strategy that specifies a coupon value for each group corresponding to the grouping strategy, and obtain user feature information of one or more target users in each group corresponding to each candidate coupon issuing strategy. The systems and methods may also predict an ROI of each the candidate coupon issuing strategy based on an ROI prediction model and the corresponding user feature information. The systems and methods may further determine the optimal coupon issuing strategy based on the ROIs of the candidate coupon issuing strategies using a genetic algorithm.

According to some embodiments of the present disclosure, the optimal coupon issuing strategy may be determined using a genetic algorithm. By using the genetic algorithm, the candidate coupon issuing strategies may evolve toward better coupon issuing strategies. A coupon issuing strategy having the highest ROI among the better issuing strategies may be designated as the optimal coupon issuing strategy, improving the benefit for a coupon issuer. In addition, the optimal coupon issuing strategy may adopt customized strategies (e.g., different coupon values) for different groups of users, which may stimulate consumers to purchase products or services. Moreover, the group indicator prediction model and the ROI prediction model are used in the determination of the optimal coupon issuing strategy. The group indicator prediction model and the ROI prediction model may be trained by a machine learning algorithm using sample data of multiple dimensions. The sample data of multiple dimensions may include information from, for example, different times (e.g., historical information at different historical periods), different sources (information from different users), etc., to improve reliability or accuracy of the determination or prediction. One of the problems solved by the systems and methods of the present disclosure is the big data problem and its real time application faced by a coupon system including, for example, an ineffective use of data for determining an optimal coupon issuing strategy. These problems raise in the online service platform appeared in the post-Internet era, and the present disclosure provides solutions to these problems in a technical manner.

FIG. 1 is a schematic diagram illustrating an exemplary coupon system 100 according to some embodiments of the present disclosure. The coupon system 100 may be used to issue and/or manage coupons. As used herein, a coupon refers to a ticket or a document that can be redeemed for a discount and/or rebate for purchasing or requesting a product and/or a service. The product and/or service may include food, medicine, commodity, chemical product, electrical appliance, clothing, car, housing, luxury, or any other product, or any combination thereof. In some other embodiments, the product and/or service may include a servicing product, a financial product, a knowledge product, an Internet product, or the like, or any combination thereof. The Internet product may include an individual host product, a web product, a mobile Internet product, a commercial host product, an embedded product, or the like, or any combination thereof. The mobile internet product may be used in software of a mobile terminal, a program, a system, or the like, or any combination thereof. For example, the product may be any software and/or application used on the computer or mobile phone. The software and/or application may relate to socializing, shopping, transporting, entertainment, learning, investment, or the like, or any combination thereof.

In some embodiments, the coupons of the coupon system 100 may be used in purchasing or requesting one or more Online to Offline (O2O) services. Exemplary O2O services may include a transportation service, a meal delivery service, a delivery service, a shopping service, or the like, or any combination thereof. In some embodiments, the coupons of the coupon system 100 may be used in purchasing or requesting one or more transportation services, such as a taxi hailing service, a chauffeur service, a carpool service, a bus service, a driver hiring service, a shuttle service, or the like, or any combination thereof.

In some embodiments, the coupons of the coupon system 100 may include one or more electronic coupons. The electronic coupon(s) may be directly used in purchasing or requesting one or more products. Alternatively, the electronic coupon(s) may need to be printed as a physical copy and the physical copy may be used in purchasing or requesting the product(s).

As illustrated in FIG. 1, the coupon system 100 may include a server 110, a network 120, a user terminal 130, and a storage device 140. The server 110 may be configured to perform one or more methods for coupon issuing disclosed in this disclosure. In some embodiments, the server 110 may be a single server or a server group. The server group may be centralized or distributed (e.g., the server 110 may be a distributed system). In some embodiments, the server 110 may be local or remote. For example, the server 110 may access information and/or data stored in the user terminal 130, and/or the storage device 140 via the network 120. As another example, the server 110 may be directly connected to the user terminal 130 and/or the storage device 140 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing device 112. According to some embodiments of the present disclosure, the processing device 112 may process information and/or data related to the coupon system 100 to perform one or more functions described in the present disclosure. For example, the processing device 112 may process information (e.g., historical consumption data, user feature information) related to a plurality of target users to determine an optimal coupon issuing strategy for the target users. As another example, the processing device 112 may generate a group indicator prediction model and/or an ROI prediction model according to a machine learning algorithm.

In some embodiments, the processing device 112 may include one or more processing devices (e.g., single-core processing device(s) or multi-core processor(s)). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data in the coupon system 100. In some embodiments, one or more components of the coupon system 100 (e.g., the server 110, the user terminal 130, or the storage device 140) may transmit information and/or data to other component(s) of the coupon system 100 via the network 120. For example, the server 110 may obtain historical consumption data of one or more target users from the storage device 140 via the network 120. In some embodiments, the network 120 may be any type of wired or wireless network, or combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, through which one or more components of the coupon system 100 may be connected to the network 120 to exchange data and/or information.

The user terminal 130 may be configured to enable a user interaction between the user and other components of the coupon system 100. For example, the user may transmit a request for one or more coupons to the coupon system 100 via the user terminal 130. Additionally or alternatively, the user terminal 130 may receive and display one or more coupons issued by the coupon system 100 to the user. In some embodiments, the user terminal 130 may include a mobile device 130-1, a tablet computer 130-2, a laptop computer 130-3, a built-in device in a vehicle 130-4, a wearable device 130-5, or the like, or any combination thereof. In some embodiments, the mobile device 130-1 may include a smart home device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include Google™ Glasses, an Oculus Rift™, a HoloLens™, a Gear VR™, etc. In some embodiments, the built-in device in the vehicle 130-4 may include an onboard computer, an onboard television, etc. In some embodiments, the wearable device 130-5 may include a smart bracelet, a smart footgear, smart glasses, a smart helmet, a smart watch, smart clothing, a smart backpack, a smart accessory, or the like, or any combination thereof. In some embodiments, the user terminal 130 may be a device with positioning technology for locating the position of the service requester and/or the user terminal 130.

The storage device 140 may store data and/or instructions. In some embodiments, the storage device 140 may store data obtained from one or more components of the coupon system 100, such as the server 110 and/or the user terminal 130. In some embodiments, the storage device 140 may store data and/or instructions that the server 110 may execute or use to perform exemplary methods described in the present disclosure. For example, the storage device 140 may store instructions for determining an optimal coupon issuing strategy. As another example, the storage device 140 may store user feature information of one or more target users. In some embodiments, the storage device 140 may include a mass storage device, a removable storage device, a volatile read-and-write memory, a read-only memory (ROM), or the like, or any combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 140 may be connected to the network 120 to communicate with one or more components of the coupon system 100 (e.g., the server 110, the user terminal 130). One or more components of the coupon system 100 may access the data or instructions stored in the storage device 140 via the network 120. In some embodiments, the storage device 140 may be directly connected to or communicate with one or more components of the coupon system 100 (e.g., the server 110, the user terminal 130). In some embodiments, the storage device 140 may be part of the server 110.

It should be noted that the example illustrated in FIG. 1 and the description thereof are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. Additionally or alternatively, one or more components of the coupon system 100 described above may be omitted. For example, the storage device 140 may be omitted.

Figure 2:
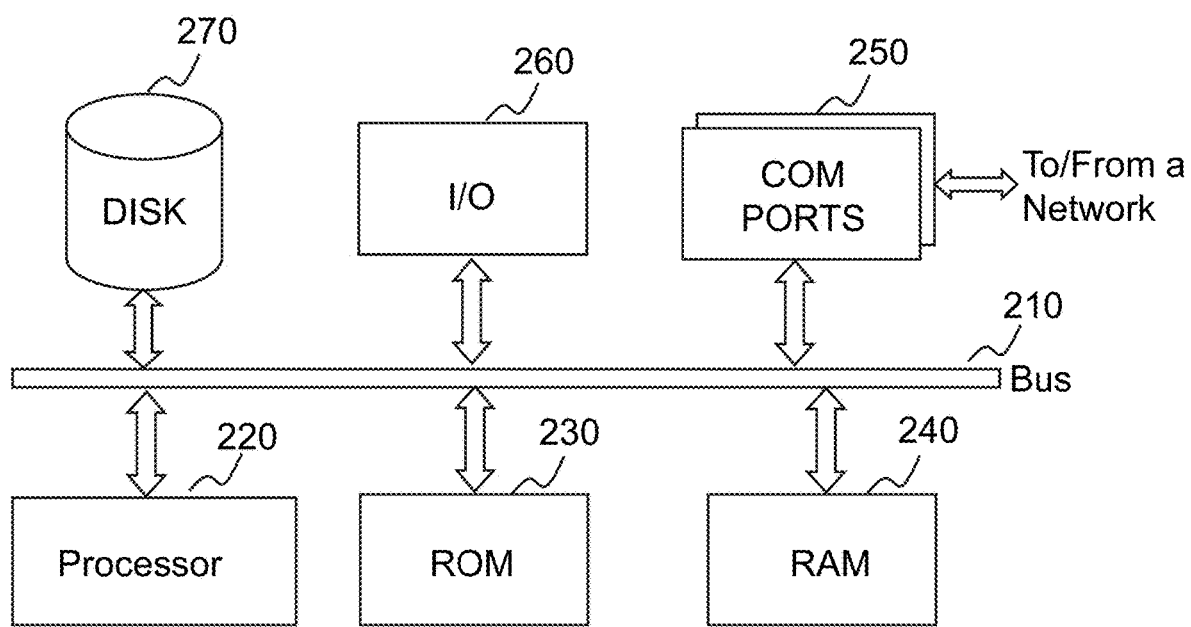
FIG. 2 is a schematic diagram illustrating exemplary hardware and/or software components of a computing device according to some embodiments of the present disclosure.

FIG. 2 is a schematic diagram illustrating exemplary hardware and software components of a computing device 200 according to some embodiments of the present disclosure. The computing device 200 may be used to implement any component of the coupon system 100 as described herein. For example, the user terminal 130 and/or the processing device 112 may be implemented on the computing device 200, respectively, via its hardware, software program, firmware, or a combination thereof. Although only one such computing device is shown, for convenience, the computer functions relating to the coupon system 100 as described herein may be implemented in a distributed fashion on a number of similar platforms, to distribute the processing load.

As illustrated in FIG. 2, the computing device 200 may include a communication bus 210, a processor 220, a storage device, an input/output (I/O) 260, and a communication port 250. The processor 220 may execute computer instructions (e.g., program code) and perform functions of one or more components of the coupon system 100 (e.g., the server 110) in accordance with techniques described herein. The computer instructions may include, for example, routines, programs, objects, components, data structures, procedures, modules, and functions, which perform particular functions described herein. In some embodiments, the processor 220 may include interface circuits and processing circuits therein. The interface circuits may be configured to receive electronic signals from the communication bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the communication bus 210.

In some embodiments, the processor 220 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor 220 is described in the computing device 200. However, it should be noted that the computing device 200 in the present disclosure may also include multiple processors, thus operations and/or method operations that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage device may store data/information related to the coupon system 100. In some embodiments, the storage device may include a mass storage device, a removable storage device, a volatile read-and-write memory, a random access memory (RAM) 240, a read-only memory (ROM) 230, a disk 270, or the like, or any combination thereof. In some embodiments, the storage device may store one or more programs and/or instructions to perform exemplary methods described in the present disclosure. For example, the storage device may store a program for the processor 220 to execute.

The I/O 260 may input and/or output signals, data, information, etc. In some embodiments, the I/O 260 may enable a user interaction with the computing device 200. In some embodiments, the I/O 260 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 250 may be connected to a network (e.g., the network 120) to facilitate data communications. The communication port 250 may establish connections between the computing device 200 and one or more components of the coupon system 100. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. In some embodiments, the communication port 250 may be and/or include a standardized communication port, such as RS232, RS485, etc. In some embodiments, the communication port 250 may be a specially designed communication port.

Figure 3:
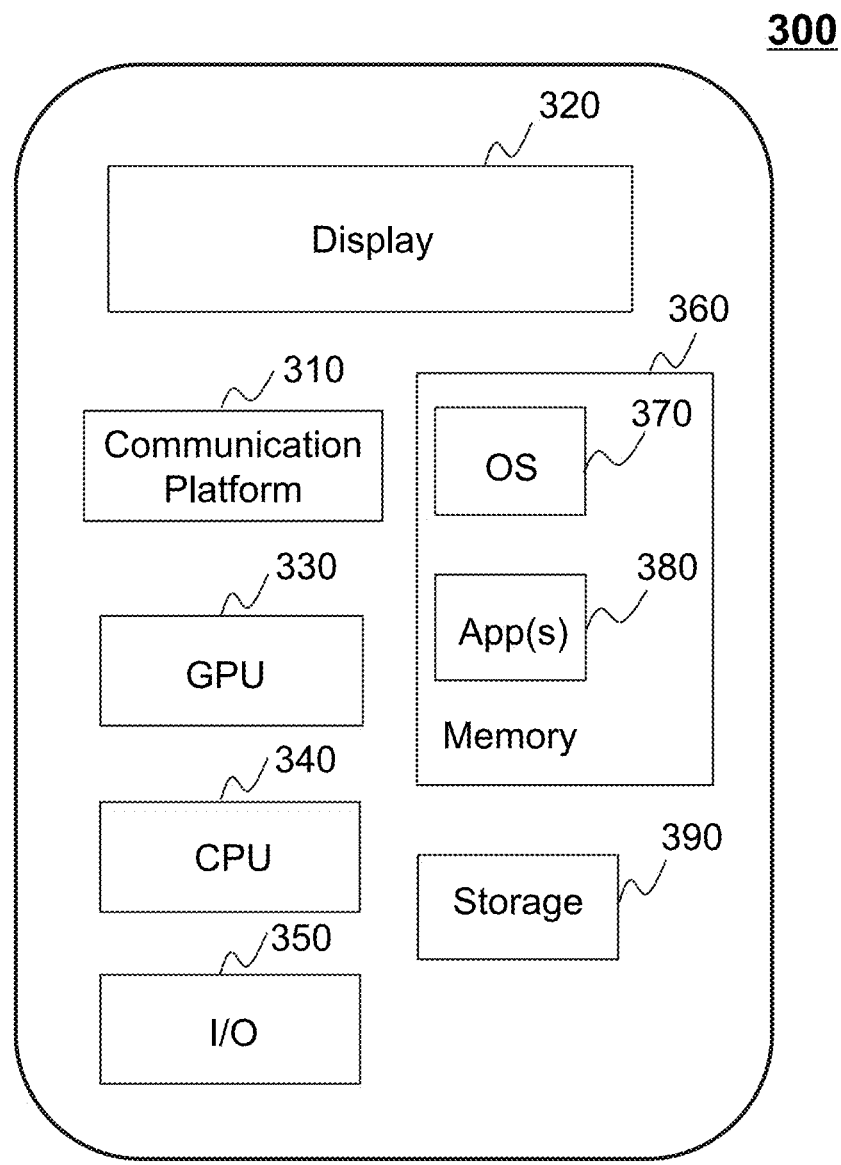
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device 300 according to some embodiments of the present disclosure. In some embodiments, one or more components of the coupon system 100, such as the user terminal 130 and/or the processing device 112 may be implemented on the mobile device 300. As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300.

In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to the coupon system 100. User interactions with the information stream may be achieved via the I/O 350 and provided to one or more other components of the coupon system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
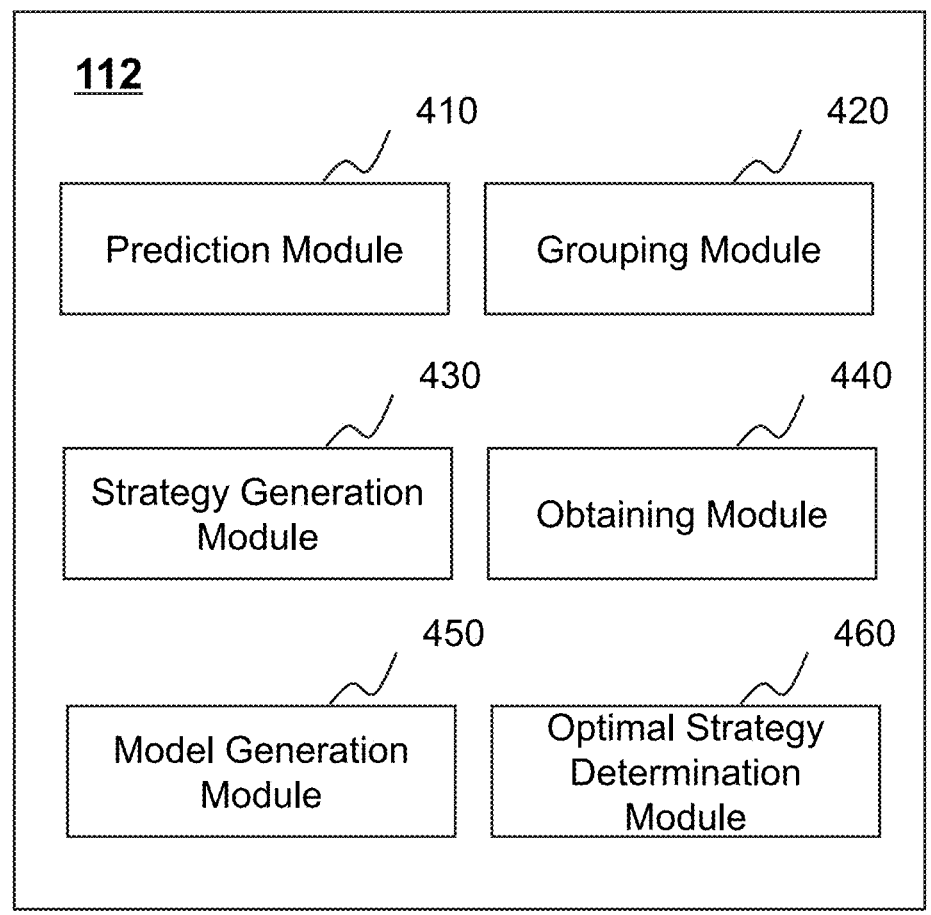
FIG. 4 is a block diagram illustrating an exemplary processing device according to some embodiments of the present disclosure.

FIG. 4 is a block diagram illustrating an exemplary processing device 112 according to some embodiments of the present disclosure. As shown in FIG. 4, the processing device 112 may include a prediction module 410, a grouping module 420, a strategy generation module 430, an obtaining module 440, a model generation module 450, and an optimal strategy determination module 460.

The prediction module 410 may be configured to determine a predicted value of a group indicator of a target user in a predetermined period. Exemplary group indicators may include a gross merchandise volume (GMV), a coupon conversion rate, an abandon rate of coupons, or the like, or any combination thereof. More descriptions regarding the determination of a predicted value of a group indicator of a target user in a predetermined period may be found elsewhere in the present disclosure. See, e.g., operation 510 in FIG. 5 and relevant descriptions thereof.

The grouping module 420 may be configured to group a plurality of target users using one or more grouping strategies. In some embodiments, a grouping strategy may be used to group the target users into a plurality of groups based on a plurality of predicted values of the group indicator of the target users. More descriptions regarding the grouping strategy may be found elsewhere in the present disclosure. See, e.g., operation 520 in FIG. 5 and relevant descriptions thereof.

The strategy generation module 430 may be configured to determine a candidate coupon issuing strategy for a grouping strategy. The candidate coupon issuing strategy corresponding to the grouping strategy may specify a coupon value for each group corresponding to the grouping strategy. More descriptions regarding the determination of a candidate coupon issuing strategy may be found elsewhere in the present disclosure. See, e.g., operation 530 in FIG. 5 and relevant descriptions thereof.

The obtaining module 440 may be configured to obtain information related to the coupon system 100. For example, the obtaining module 440 may obtain user feature information and/or historical consumption data of one or more target users. In some embodiments, the obtaining module 440 may obtain information from one or more storage devices (e.g., the storage device 140) of the coupon system 100. Additionally or alternatively, the obtaining module 440 may obtain information from an external source via a network (e.g., the network 120).

The model generation module 450 may be configured to generate one or more models. For example, the model generation module 450 may generate an ROI prediction model and/or a group indicator prediction model according to a machine learning algorithm. More descriptions regarding the generation of the group indicator prediction model may be found elsewhere in the present disclosure. See, e.g., FIG. 6 and relevant descriptions thereof. More descriptions regarding the generation of the ROI prediction model may be found elsewhere in the present disclosure. See, e.g., FIG. 7 and relevant descriptions thereof.

The modules may be hardware circuits of all or part of the processing device 112. The modules may also be implemented as an application or set of instructions read and executed by the processing device 112. Further, the modules may be any combination of the hardware circuits and the application/instructions. For example, the modules may be the part of the processing device 112 when the processing device 112 is executing the application/set of instructions. The modules in the processing device 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units.

It should be noted that the above descriptions of the processing devices 112 is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure. For example, the model generation module 450 may be divided into a first unit configured to generate the group indicator prediction model and a second unit configured to generate the ROI prediction model. In some embodiments, one or more of the modules mentioned above may be omitted. For example, the model generation module 450 may be omitted and implemented on another computing device. In some embodiments, one or more of the modules mentioned above may be combined into a single module. For example, the grouping module 420 and the strategy generation module 430 may be integrated into a single module. In some embodiments, the processing device 112 may further include one or more additional modules, such as a storage module.

Figure 5:
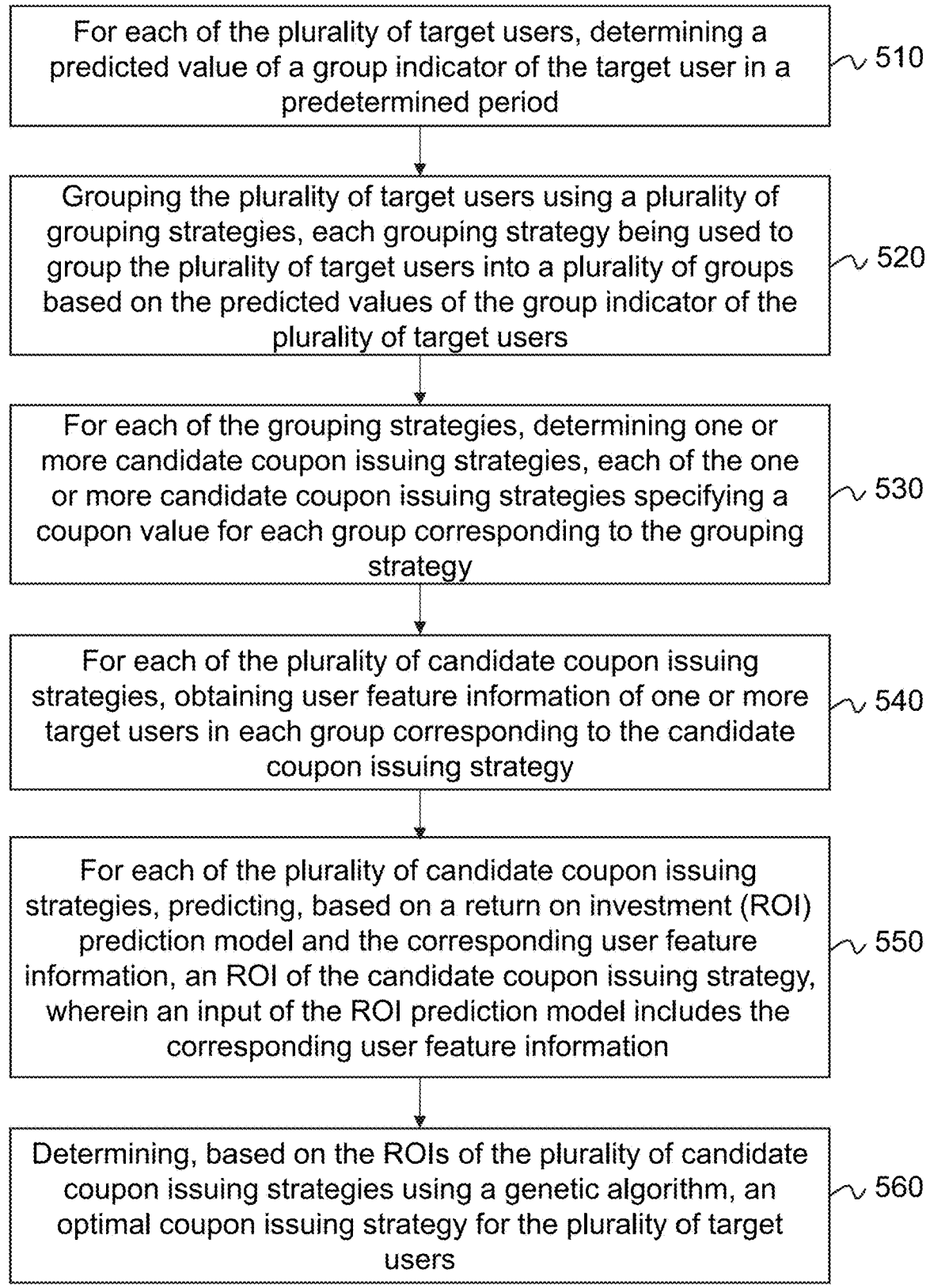
FIG. 5 is a flowchart illustrating an exemplary process for issuing coupons to a plurality of target users according to some embodiments of the present disclosure.

FIG. 5 is a flowchart illustrating an exemplary process for issuing coupons to a plurality of target users according to some embodiments of the present disclosure. In some embodiments, process 500 may be executed by the coupon system 100. For example, the process 500 may be implemented as a set of instructions (e.g., an application) stored in a storage device (e.g., the storage device 140, the ROM 230, the RAM 240, the storage 390). In some embodiments, the processing device 112 (e.g., the processor 220 of the computing device 200, the CPU 340 of the mobile device 300, and/or one or more modules illustrated in FIG. 4) may execute the set of instructions and may accordingly be directed to perform the process 500.

In 510, for each target user, the processing device 112 (e.g., the prediction module 410) (e.g., the processing circuits of the processor 220) may determine a predicted value of a group indicator of the target user in a predetermined period.

As used herein, the group indicator may refer to an indicator that can be used as a basis for grouping the target users. For example, the group indicator may include a gross merchandise volume (GMV), a coupon conversion rate, an abandon rate of coupons, or the like, or any combination thereof. The GMV of a target user may refer to an amount of total sales value for merchandise (e.g., a product, a service) brought by the target user through a particular marketplace (e.g., an O2O service platform) over a certain time frame. The coupon conversion rate of a target user may indicate a probability that a coupon is used by the target user after the coupon is issued to the target user. In some embodiments, if a plurality of coupons are issued to the target user, the coupon conversion rate may be a percentage of one or more coupons that are used by the target user in all the coupons issued to the target user. The abandon rate of coupons of a target user may indicate a probability that a coupon is not used by the target user after the coupon is issued to the target user. In some embodiments, if a plurality of coupons are issued to the target user, the coupon churn rate may be a percentage of coupons that are not used by the target user in all the coupons issued to the target user.

A predetermined period may refer to a period in the future with respect to the present moment. For example, the predetermined period may be a week, a certain number of days (e.g., five days, ten days, twenty days), a month, half a year after the present moment, or the like.

Taking a target user as an example, in some embodiments, the processing device 112 may determine a predicted value of a group indicator of a target user by analyzing historical consumption data of the target user. The historical consumption data of the target user may include, for example, historical order information, historical coupon usage information, historical coupon issuing information, or the like, or any combination thereof. For instance, the historical order information may include information related to historical service orders of the target user, such as a transaction price, a service duration, a start time, an end time, position information (e.g., a start location, a destination) of each historical service order, user preference information (e.g., a preferred product or service type), the count (or number) of historical service orders in a historical period, or the like, or any combination thereof. The historical coupon usage information may include information related to one or more coupons that have been used by the target user, such as a coupon value, a use time, a coupon type (e.g., a transportation service coupon, a restaurant coupon, or a movie coupon), a validity period, a condition for use of each of the used coupon(s), a count (or number) of the used coupon(s), or the like, or any combination thereof. The historical coupon issuing information may include information related to one or more coupons that have been issued to the target user, such as a coupon value, a coupon type, an issuing time, a coupon state (e.g., whether a coupon has been used by the target user or not), a validity period, a condition for use of each of the issued coupon(s), a count (or number) of the issued coupon(s), or the like, or any combination thereof.

In some embodiments, the historical consumption data of the target user may include historical consumption data in a preset historical period, for example, last year, last six months, last three weeks, or the like. The historical consumption data may be stored in a storage device (e.g., the storage device 140, the ROM 230, the RAM 240, the storage 390) and/or an external source. The processing device 112 may obtain the historical consumption data of the target user from the storage device and/or the external source, and determine the predicted value of the group indicator of the target user based on the obtained historical consumption data. Merely by way of example, the processing device 112 may obtain a historical GMV of the target user in each week in the last month, and determine an average value of the obtained historical GMVs as a predicted GMV of the target user in the next week.

In some embodiments, the processing device 112 may determine the predicted value of the group indicator of the target user based on the historical consumption data as well as a group indicator prediction model. The group indicator prediction model may refer to a model that can output a predicted value of the group indicator based on an input of the group indicator prediction model. In some embodiments, the processing device 112 may obtain the group indicator prediction model and the historical consumption data. The processing device 112 may further determine the predicted value of the group indicator of the target user based on the group indicator prediction model and the historical consumption data of the target user, wherein an input of the group indicator prediction model may include the historical consumption data of the target user. In some embodiments, the input of the group indicator prediction model may further include information other than the historical consumption data, such as user feature information (e.g., age, gender, income, occupation, family status) of the target user.

In some embodiments, the group indicator prediction model may be generated by the processing device 112 or another computing device in advance, and stored in a storage device (e.g., the storage device 140, the ROM 230, the RAM 240, the storage 390) of the coupon system 100 or an external source. The processing device 112 may obtain the group indicator prediction model from the storage device or the external source. In some embodiments, the group indicator prediction model may be generated according to a machine learning algorithm. The machine learning algorithm may include but not be limited to an artificial neural network algorithm, a deep learning algorithm, a decision tree algorithm, an association rule algorithm, an inductive logic programming algorithm, a support vector machine algorithm, a clustering algorithm, a Bayesian network algorithm, a reinforcement learning algorithm, a representation learning algorithm, a similarity and metric learning algorithm, a sparse dictionary learning algorithm, a genetic algorithm, a rule-based machine learning algorithm, or the like, or any combination thereof. In some embodiments, the group indicator prediction model may be generated according to a group indicator prediction model training process. The group indicator prediction model training process may include one or more operations of process 600 as described in connection with FIG. 6.

In 520, the processing device 112 (e.g., the grouping module 420) (e.g., the processing circuits of the processor 220) may group the target users using a plurality of grouping strategies.

As used herein, a grouping strategy may refer to a strategy or way of grouping the target users into a plurality of groups based on the predicted values of the group indicator of the target users. In some embodiments, the grouping strategy may define one or more threshold values (or ranges) (also referred to as grouping nodes) relating to the group indicator. Taking the coupon conversion rate as an example, a grouping strategy A may define two threshold values relating to the coupon conversion rate, e.g., 35% and 65%. The target users may be ranked according to the predicted values of the coupon conversion rate in, for example, a descending order. The target users may then be grouped into 3 groups according to the threshold values relating to the coupon conversion rate, including a group A1 in the top 35% of the ranking result, a group A2 in the bottom 35% of the ranking result, and a group A3 including the remaining target user(s). In some embodiments, different grouping strategies may define different threshold values (or ranges) relating to the group indicator, thus forming different groups of the target users.

In some embodiments, the grouping strategies for grouping the target users may be a default setting of the coupon system 100 or be inputted by a user of the coupon system 100. Additionally or alternatively, the grouping strategies may be determined by a computing device (e.g., the processing device 112) according to, for example, a numerical range of the predicted values of the group indicator.

In 530, for each of the grouping strategies, the processing device 112 (e.g., the strategy generation module 430) (e.g., the processing circuits of the processor 220) may determine one or more candidate coupon issuing strategies. Each of the one or more the candidate coupon issuing strategies corresponding to a grouping strategy may specify a coupon value for each group corresponding to the grouping strategy.

As used herein, a coupon value may refer to a discount rate or amount, such as a 10% discount, a price reduction of $2, or the like. For a grouping strategy, the coupon values of different groups corresponding to the grouping strategy may be the same with or different from each other. For example, as described in connection with operation 520, the grouping strategy A may group the target user into the groups A1, A2, and A3 according to the predicted values of the coupon conversion rate of the target users. The processing device 112 may determine a first candidate coupon issuing strategy and/or a second candidate coupon issuing strategy for the grouping strategy A. The first candidate coupon issuing strategy may specify that coupon values of the groups A1, A2, and A3 are, e.g., 50% discount, no discount, and 12%, respectively. The second candidate coupon issuing strategy may specify that the coupon values of the groups A1, A2, and A3 are, e.g., 12% discount, no discount, and 50%, respectively. In some embodiments, the candidate coupon issuing strategies may be recorded as one or more binary codes.

In 540, for each of the candidate coupon issuing strategies, the processing device 112 (e.g., the obtaining module 440) (e.g., the interface circuits of the processor 220) may obtain user feature information of one or more target users in each group corresponding to the candidate coupon issuing strategy.

Taking a certain group corresponding to a candidate coupon issuing strategy as an example, exemplary user feature information of one or more target users in the certain group may include a count (or number) of the target user(s), a proportion of the count (or number) of the target user(s) in a count (or number) of all the target users, profile information (e.g., an average age, a sex distribution) of the target user(s), historical service order information (e.g., a total number of historical service orders, an average number (or count) of historical service orders) of the target user(s), or the like, or any combination thereof.

In 550, for each of the candidate coupon issuing strategies, the processing device 112 (e.g., the optimal strategy determination module 460) (e.g., the processing circuits of the processor 220) may predict an ROI of the candidate coupon issuing strategy based on an ROI prediction model and the corresponding user feature information, wherein an input of the ROI prediction model includes the corresponding user feature information.

As used herein, an ROI of a candidate coupon issuing strategy may measure a gain or loss of applying the candidate coupon issuing strategy. For example, the ROI of the candidate coupon issuing strategy may be equal to a ratio of a predicted net profit of the candidate coupon issuing strategy to a predicted cost of issuing coupons according to the candidate coupon issuing strategy. The ROI prediction model may refer to a model that can output a predicted value of the ROI of the candidate coupon issuing strategy based on an input of the ROI prediction model.

In some embodiments, the ROI prediction model may be generated by the processing device 112 or another computing device in advance, and stored in a storage device (e.g., the storage device 140, the ROM 230, the RAM 240, the storage 390) of the coupon system 100 or an external source. The processing device 112 may obtain the ROI prediction model from the storage device or the external source. In some embodiments, the ROI prediction model may be generated based on a machine learning algorithm as described elsewhere in this disclosure (e.g., operation 510 and the relevant descriptions). For example, the ROI prediction model may be generated according to a decision tree algorithm, such as but not be limited to an extreme gradient boosting (XGBoost) model, a classification and regression tree (CART) model, an iterative dichotomiser 3 (ID3) model, a chi-square automatic interaction detection (CHAID) model, a multivariate adaptive regression spline (MARS) model, a C4.5 model, or the like, or any combination thereof. In some embodiments, the ROI prediction model may be generated according to an ROI prediction model training process. The ROI prediction model training process may include one or more operations of process 700 as described in connection with FIG. 7.

In 560, the processing device 112 (e.g., the grouping module 420) (e.g., the processing circuits of the processor 220) may determine an optimal coupon issuing strategy for the target users based on the ROIs of the candidate coupon issuing strategies using a genetic algorithm.

As used herein, an optimal coupon issuing strategy may refer to a coupon issuing strategy, an ROI (or predicted ROI) of which reaches a predetermined threshold or is the highest among a plurality of candidate coupon issuing strategies. A genetic algorithm may be a computational model that is inspired by the process of biological evolution and natural selection. According to a genetic algorithm, a plurality of candidate solutions to an optimization problem may evolve toward one or more better solutions. Each candidate solution may have one or more properties regarded as its chromosomes or genotype, and the one or more properties may be mutated and/or altered in the evolution. The evolution of the candidate solutions may be an iterative process, wherein the candidate solutions in each iteration may be regarded as a generation. In each generation, fitness of each candidate solution may be evaluated, wherein the fitness may reflect a value of an objective function of the optimization problem to be solved. One or more genetic operators, such as mutation (e.g., altering a value of a property of a candidate solution), crossover (e.g., exchanging values of a property between two candidate solutions), and/or selection (e.g., retaining a candidate solution with a fitness higher than a threshold) may be applied to the candidate solutions in each generation to form a plurality of evolved candidate solutions (i.e., a new generation). The new generation of evolved candidate solutions may then be used in the next iteration of the genetic algorithm. In some cases, the evolution according to the generic algorithm may terminate when a termination condition is satisfied, for example, a maximum number (or count) of generations has been produced, or a satisfactory fitness level has been reached for the latest generation.

In the present disclosure, the optimization problem is to determine an optimal coupon issuing strategy. The candidate coupon issuing strategies determined in operation 540 may be regarded as the initial candidate solutions (i.e., the initial generation) to be evolved. The ROIs of the candidate coupon issuing strategies may reflect the fitness of the candidate coupon issuing strategies. In some embodiments, the processing device 112 may perform one or more iterations as described in connection with FIG. 8 to evolve the candidate coupon issuing strategies so as to determine the optimal coupon issuing strategy.

It should be noted that the above description of the process 500 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the process 500 may be accomplished with one or more additional operations not described and/or without one or more of the operations herein discussed. Additionally, the order of the process 500 may not be intended to be limiting.

In some embodiments, in 510, for each target user, the processing device 112 may determine predicted values of a plurality of group indicators of the target user in the predetermined period. A grouping strategy may be used to group the target users into a plurality of groups based on the predicted values of the group indicators. For example, assuming that the group indicators include the GMV and the coupon conversion rate, a specific grouping strategy may define two threshold values (e.g., 30% and 60%) relating to the GMV and two threshold values (e.g., 35% and 65%) relating to the coupon conversion rate. In this case, the target users may be grouped into 9 groups according to the specific grouping strategy.

Figure 6:
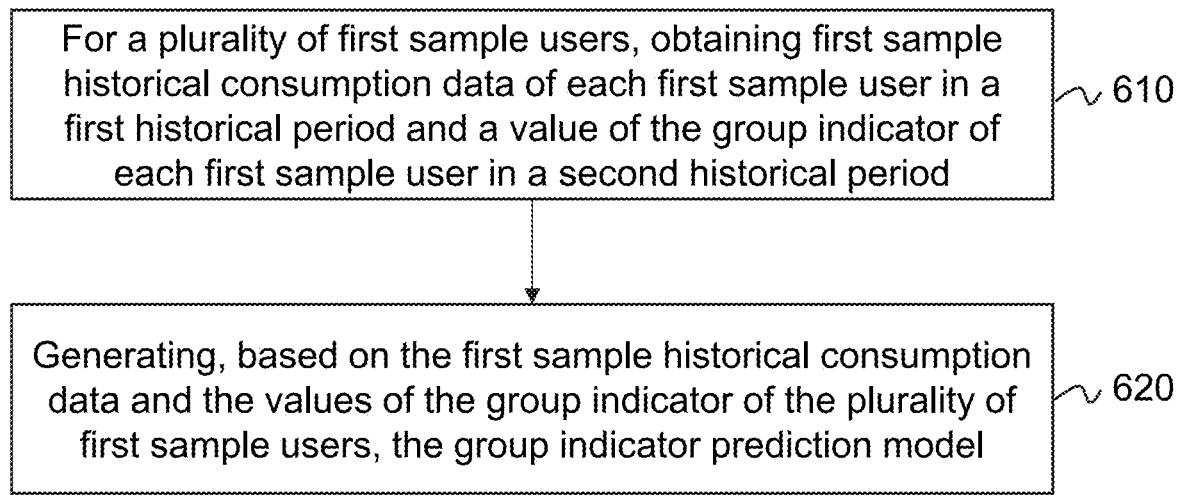
FIG. 6 is a flowchart illustrating an exemplary process for training a group indicator prediction model according to some embodiments of the present disclosure.

FIG. 6 is a flowchart illustrating a process for training a group indicator prediction model according to some embodiments of the present disclosure. In some embodiments, process 600 may be executed by the coupon system 100. For example, the process 600 may be implemented as a set of instructions (e.g., an application) stored in a storage device (e.g., the storage device 140, the ROM 230, the RAM 240, the storage 390). In some embodiments, the processing device 112 (e.g., the processor 220 of the computing device 200, the CPU 340 of the mobile device 300, and/or one or more modules illustrated in FIG. 4) may execute the set of instructions and may accordingly be directed to perform the process 600. In some embodiments, one or more operations of the process 600 may be performed to achieve at least part of operation 510 as described in connection with FIG. 5.

In 610, for a plurality of first sample users, the processing device 112 (e.g., the model generation module 450) (e.g., the interface circuits of the processor 220) may obtain first sample historical consumption data of each first sample user in a first historical period and a value of the group indicator of each first sample user in a second historical period.

As used herein, the first sample historical consumption data of a first sample user in the first historical period may refer to historical consumption data, such as historical order information, historical coupon usage information, historical coupon issuing information of the first sample user in the first historical period. A first sample user may refer to any user whose historical consumption data is available. For example, the plurality of first sample users may include a plurality of registered users of an O2O service system. The first historical period and the second historical period may be two different historical periods with respect to the present moment. In some embodiments, the second historical period may be a historical period after the first historical period. The durations of the first historical period and the second historical period may be the same or different. The first historical period and the second historical period may at least partially overlap with each other or not overlap at all.

For example, the second historical period may be the last week and the first historical period may be a week before the last week.

In some embodiments, the first sample historical consumption data of a first sample user may be obtained in a similar manner with the historical consumption data of a target user as described in connection with 510, and the descriptions thereof are not repeated here. In some embodiments, the processing device 112 may obtain sample historical consumption data of each first sample user in the second historical period, and determine the value of the group indicator of each first sample user in the second historical period based on the sample historical consumption data of the first sample user in the second historical period. Taking a GMV of a first sample user as an example, the processing device 112 may determine a value of the GMV of the first sample user in last week based on historical consumption data of the first sample user in last week.

In 620, the processing device 112 (e.g., the model generation module 450) (e.g., the processing circuits of the processor 220) may generate the group indicator prediction model based on the first sample historical consumption data and the values of the group indicator of the first sample users.

In some embodiments, the processing device 112 may generate the group indicator prediction model by training a first initial model using the first sample historical consumption data and the values of the group indicator of the first sample users according to a machine learning algorithm as described elsewhere in this disclosure (e.g., operation 510 and the relevant descriptions). For illustration purposes, an exemplary training process of the first initial model is described hereinafter. It should be understood that the following description is merely an example, and not intended to limit the scope of the present disclosure.

In some embodiments, the first initial model may be any suitable machine learning model, such as a gradient boosting decision tree model, an XGBoost model, a CART model, an ID3 model, a CHAID model, a MARS model, a C4.5 model, or the like. The first initial model may have an initial setting (e.g., one or more initial values of one or more model parameters). Taking the XGBoost model as an example, the first initial model may include one or more model parameters, such as a booster type (e.g., tree-based model or linear model), a booster parameter (e.g., a maximum depth, a maximum number of leaf nodes), a learning task parameter (e.g., an objective function of training), or the like, or any combination thereof.

The processing device 112 may iteratively update the value(s) of the model parameter(s) of the first initial model based on the first sample historical consumption data and the values of the group indicator of the first sample users. In each current iteration, for each first sample user, the processing device 112 may input the corresponding first sample historical consumption data into the first initial model updated in the previous iteration to determine a predicted value of the group indicator of the first sample user in the second historical period. The processing device 112 may then determine a value of a loss function (or an objective function) based on the predicted values and known values of the group indicator of the first sample users in the second historical period, wherein the loss function (or the objective function) may measure a difference between the predicted values and known values of the group indicator of the first sample users. The processing device 112 may further update the first initial model in the current iteration by updating the value(s) of the model parameter(s) based on the value of the loss function (or the objective function).

In some embodiments, the value(s) of the model parameter(s) may be updated iteratively in order to minimize the value of the loss function (or the objective function). The iterative process may continue until a termination condition is satisfied. An exemplary termination condition is that the value of the loss function obtained in an iteration is less than a predetermined threshold. Other exemplary termination conditions may include that a certain count of iterations are performed, that the loss function converges such that the differences of the values of the loss function obtained in consecutive iterations are within a threshold, etc. After the termination condition is satisfied in a certain iteration, the first initial model having the updated value(s) of the model parameter(s) may be designated as the group indicator prediction model.

It should be noted that the above description of the process 600 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the operations of the process 600 are intended to be illustrative. The process 600 may be accomplished with one or more additional operations not described and/or without one or more of the operations herein discussed. Additionally, the order in which the operations of the process 600 described above is not intended to be limiting. In some embodiments, in 610, the processing device 112 may obtain other information related to the first sample users, such as profile information (e.g., age, gender, and/or income). In 620, the processing device 112 may generate the group indicator prediction model based on the first sample historical consumption data, the values of the group indicator in the second historical period, and the other information related to the first sample users. In some embodiments, the processing device 112 may update the group indicator prediction model periodically or irregularly.

In some embodiments, the determination and/or the updating of the group indicator prediction model may be performed on a processing device, while the application of the group indicator prediction model may be performed on a different processing device. In some embodiments, the determination and/or updating of the group indicator prediction model may be performed on a processing device of a system different than the coupon system 100 or a server different than the server 110 on which the application of the group indicator prediction model is performed. For instance, the determination and/or updating of the group indicator prediction model may be performed on a first system of a vendor who provides and/or maintains such a group indicator prediction model and/or has access to training samples used to determine and/or update the group indicator prediction model, while a determination of a predicted value of a group indicator based on the provided group indicator prediction model may be performed on a second system of a client of the vendor. In some embodiments, the determination and/or updating of the group indicator prediction model may be performed online in response to a request for determining a predicted value of a group indicator. In some embodiments, the determination and/or updating of the group indicator prediction model may be performed offline.

Figure 7:
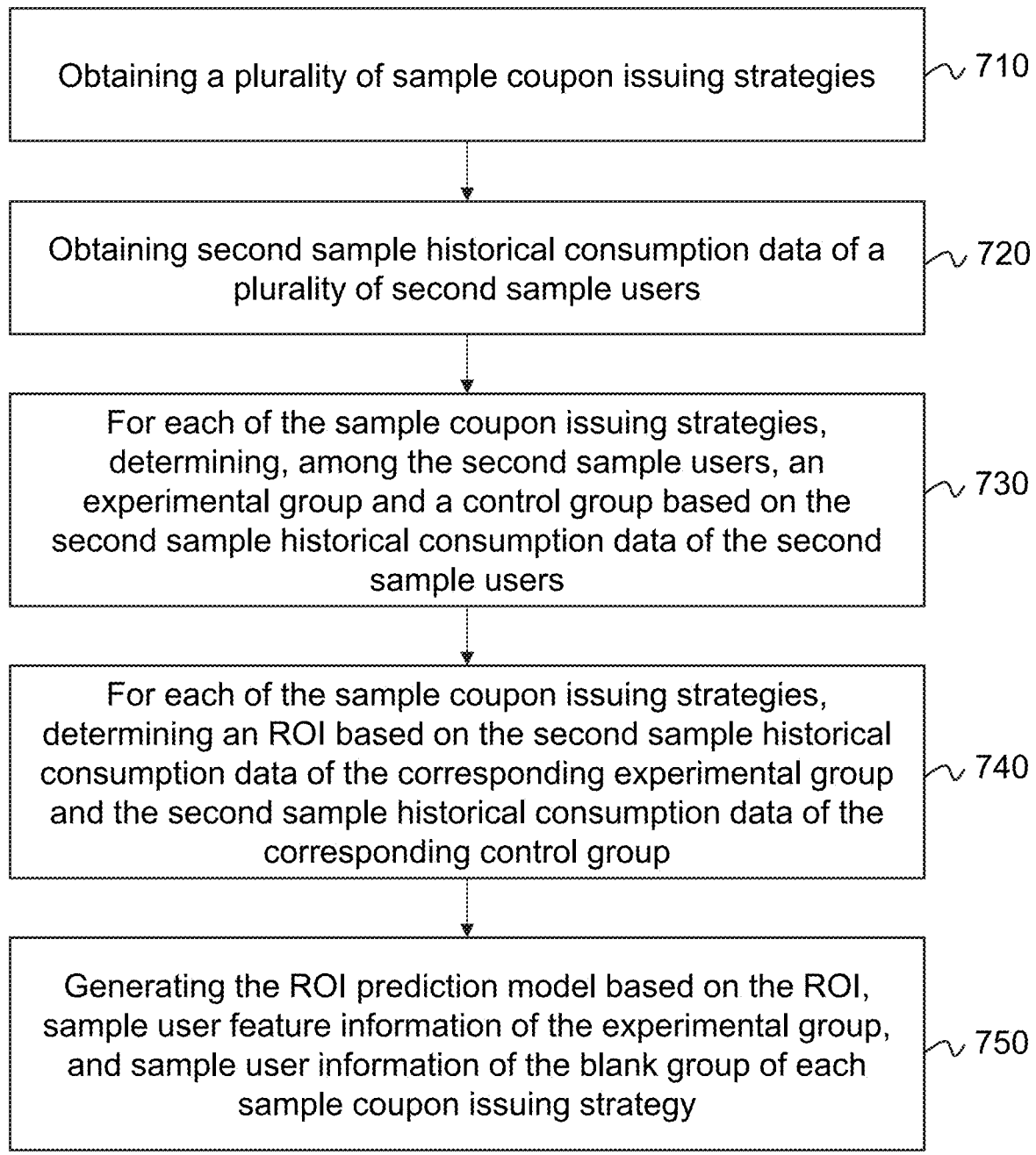
FIG. 7 is a flowchart illustrating an exemplary process for training an ROI prediction model according to some embodiments of the present disclosure.

FIG. 7 is a flowchart illustrating a process for training an ROI prediction model according to some embodiments of the present disclosure. In some embodiments, process 700 may be executed by the coupon system 100. For example, the process 700 may be implemented as a set of instructions (e.g., an application) stored in a storage device (e.g., the storage device 140, the ROM 230, the RAM 240, the storage 390). In some embodiments, the processing device 112 (e.g., the processor 220 of the computing device 200, the CPU 340 of the mobile device 300, and/or one or more modules illustrated in FIG. 4) may execute the set of instructions and may accordingly be directed to perform the process 700. In some embodiments, one or more operations of the process 700 may be performed to achieve at least part of operation 550 as described in connection with FIG. 5.

In 710, the processing device 112 (e.g., the model generation module 450) (e.g., the interface circuits of the processor 220) may obtain a plurality of sample coupon issuing strategies (also referred to as training strategies).

As used herein, a sample coupon issuing strategy may refer to a coupon issuing strategy used as sample data in model training. Each sample coupon issuing strategy may correspond to a grouping strategy and specify a coupon value for each group corresponding to the grouping strategy. Merely by way of example, a sample coupon issuing strategy B may correspond to a grouping strategy C, wherein the grouping strategy C may define two threshold values (e.g., 30% and 60%) relating to the GMV. The grouping strategy C may be used to group a plurality of users into three groups, for example, a group C1 of users with the top 30% GMVs, a group C2 of users with the bottom 40% GMVs, and a group C3 of the remaining users. The sample coupon issuing strategy B may specify that coupon values of the groups C1, C2, and C3 are a 50% discount, no discount, and a 12% discount, respectively.

In some embodiments, the processing device 112 may generate the sample coupon issuing strategies by defining different grouping strategies (e.g., different threshold values for grouping) and/or different coupon values for each grouping strategy. Additionally or alternatively, one or more of the sample coupon issuing strategies may be previously determined and stored in a storage device (e.g., the storage device 140, the ROM 230, the RAM 240, the storage 390) of the coupon system 100 and/or an external source. The processing device 112 may obtain the one or more of the sample coupon issuing strategies from the storage device and/or the external source. In some embodiments, the count (or number) of the sample coupon issuing strategies obtained and/or determined in 710 may be greater than a threshold number (e.g., one hundred thousand, two hundred thousand, ten hundred thousand). This may improve accuracy of the ROI prediction model generated based on the sample coupon issuing strategies.

In 720, the processing device 112 (e.g., the model generation module 450) (e.g., the interface circuits of the processor 220) may obtain second sample historical consumption data of a plurality of second sample users.

As used herein, the second sample historical consumption data of a second sample user may refer to historical consumption data, such as historical order information, historical coupon usage information, historical coupon issuing information of the second sample user. A second sample user may refer to any user whose historical consumption data is available. For example, the plurality of second sample users may include a plurality of registered users of an O2O service system. In some embodiments, the first sample users used in training the group indicator prediction model and the second sample users used in training the ROI prediction model may be the same or different. For example, the first sample users and the second sample users may be two user sets without intersection.

In 730, for each of the sample coupon issuing strategies, the processing device 112 (e.g., the model generation module 450) (e.g., the processing circuits of the processor 220) may determine an experimental group and a control group among the second sample users based on the second sample historical consumption data of the second sample users.

As used herein, an experimental group determined for a sample coupon issuing strategy may include one or more second sample users who have received a coupon matching the sample coupon issuing strategy. A coupon matching a sample coupon issuing strategy may refer to a coupon with a coupon value specified by the sample coupon issuing strategy. Take the sample coupon issuing strategy B described above as an example, the experimental group may include a group B1 of second sample users who have received a coupon with 50% discount, a group B2 of second sample users who haven't received a coupon, and a group B3 of second sample users who have received a coupon with 12% discount. In some embodiments, the second sample users in the groups B1, B2, and B3 may be determined based on the grouping strategy C corresponding to the sample coupon issuing strategy 8. For example, the proportions of the numbers of the second sample users in the groups B1, B2, and B3 may be equal to 30:30:40, which may be equal to the proportions of the numbers of users in the groups C1, C2, and C3 described above. Additionally or alternatively, the GMV of the group B1 may be the highest and the GMV of the group B3 may be lowest among the groups B1, B2, and B3. The GMV of a group may be measured by, for example, an average GMV, a median GMV, a highest GMV, a lowest GMV of the second sample users in the group. In some embodiments, the GMV of a second sample user may be an actual GMV determined based on the second sample historical consumption data of the second sample user. Alternatively, the GMV of the second sample user may be a predicted GMV determined based on the second sample historical consumption data of the second sample user and a group indicator prediction model (e.g., the group indicator prediction model as described in connection with operation 510).

A control group determined for a sample coupon issuing strategy may include one or more second sample users who haven't received a coupon. In some embodiments, the control group may be randomly selected from the plurality of second sample users. In some embodiments, the count (or number) of second sample users in the control group may be a default setting of the coupon system 100 or be determined according to different situations. For example, the count (or number) of second sample users in the control group may be equal to the count (or number) of second sample users in the experimental group.

In 740, for each of the sample coupon issuing strategies, the processing device 112 (e.g., the model generation module 450) (e.g., the processing circuits of the processor 220) may determine an ROI based on the second sample historical consumption data of the corresponding experimental group and the second sample historical consumption data of the corresponding control group.

Taking the sample coupon issuing strategy B as an example, the processing device 112 may determine an $ROI_B$ based on the second sample historical consumption data of the corresponding experimental group (i.e., the groups B1, B2, and B3) and the second sample historical consumption data of the corresponding control group. The $ROI_B$ may measure a gain or loss generated on an investment (i.e., issuing coupons to the second sample users in the groups B1, B2, and B3) relative to the amount of money invested for the investment. Merely by way of example, the $ROI_B$ may be equal to $\Delta GMV/\Delta C$. The $\Delta GMV$ may represent a profit gained from issuing coupons to the groups B1, B2, and B3, which may be equal to, for example, a difference between a total GMV of the experimental group and a total GMV of the control group. $\Delta C$ may represent a cost for issuing coupons to groups B1, B2, and B3, which may be equal to, for example, a difference between a total coupon value issued to (or used by) the experimental group and a total coupon value issued to (or used by) the control group. In some embodiments, the total coupon value issued to the experimental group may be equal to, for example, a sum of the coupon values of the coupons issued to the groups B1, B2, and B3, a total amount of money saved by the groups B1, B2, and B3 by using coupons. The total coupon value issued to the control group may be equal to zero.

In 750, the processing device 112 (e.g., the model generation module 450) (e.g., the processing circuits of the processor 220) may generate the ROI prediction model based on the ROI, sample user feature information of the experimental group, and sample user information of the control group of each sample coupon issuing strategy.

As used herein, the sample user feature information of a group (e.g., an experimental group, a control group) may refer to user feature information of one or more users in the group, which is used as sample data in model training. The sample user feature information of the group may include, a count (or number) of the user(s) in the group, a percentage of the count (or number) of the user(s) in the group in a count (or number) of all the target users, profile information (e.g., an average age, a sex distribution) of the user(s) in the group, historical service order information (e.g., a total number of historical service orders, an average number (or count) of historical service orders) of the user(s) in the group, or the like, or any combination thereof.

In some embodiment, the processing device 112 may generate the ROI prediction model by training a second initial model using the second sample user feature information of the experimental group, the second sample user feature information of the control group, and the ROI of each sample coupon issuing strategy according to a machine learning algorithm as described elsewhere in this disclosure (e.g., operation 510 and the relevant descriptions). In some embodiments, the second initial model may be any suitable machine learning model, such as a gradient boosting decision tree model or an XGBoost model. In some embodiments, the second initial model may be trained in a similar manner with the first initial model as described in connection with operation 620, and the descriptions thereof are not repeated here.

It should be noted that the above description of the process 700 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the operations of the process 700 are intended to be illustrative. The process 700 may be accomplished with one or more additional operations not described and/or without one or more of the operations herein discussed. Additionally, the order in which the operations of the process 700 described above is not intended to be limiting. For example, operations 710 and 720 may be performed simultaneously, or operation 720 may be performed before operation 710. In some embodiments, the processing device 112 may update the ROI prediction model periodically or irregularly.

In some embodiments, the determination and/or the updating of the ROI prediction model may be performed on a processing device, while the application of the ROI prediction model may be performed on a different processing device. In some embodiments, the determination and/or updating of the ROI prediction model may be performed on a processing device of a system different than the coupon system 100 or a server different than the server 110 on which the application of the ROI prediction model is performed. For instance, the determination and/or updating of the ROI prediction model may be performed on a first system of a vendor who provides and/or maintains such a ROI prediction model and/or has access to training samples used to determine and/or update the group indicator prediction model, while a determination of an ROI of a candidate coupon issuing strategy based on the provided ROI prediction model may be performed on a second system of a client of the vendor. In some embodiments, the determination and/or updating of the ROI prediction model may be performed online in response to a request for determining an ROI of a candidate coupon issuing strategy. In some embodiments, the determination and/or updating of the ROI prediction model may be performed offline.

Figure 8:
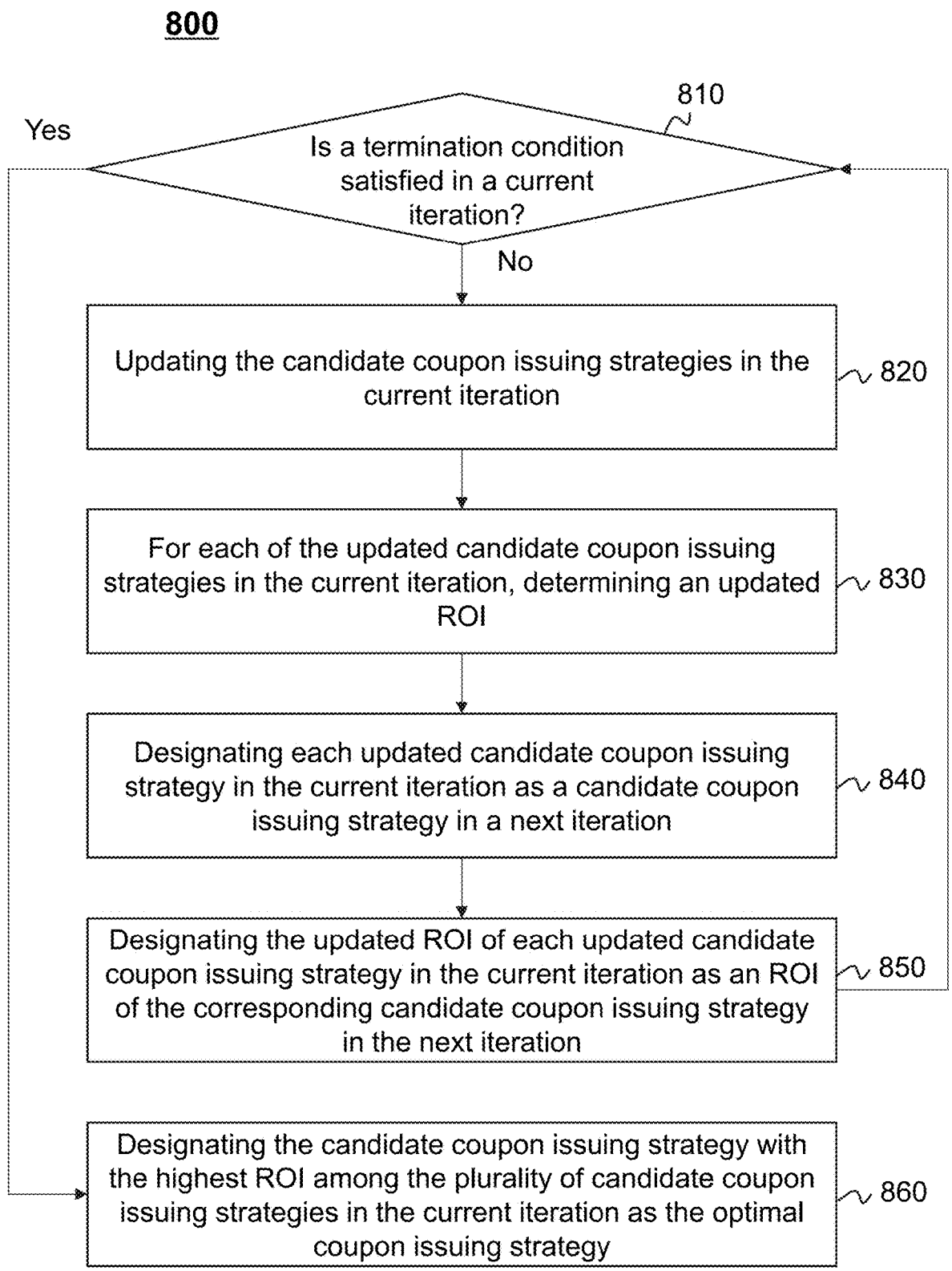
FIG. 8 is a flowchart illustrating an exemplary process for determining an optimal coupon issuing strategy for a plurality of target users according to some embodiments of the present disclosure.

FIG. 8 is a flowchart illustrating an exemplary process for determining an optimal coupon issuing strategy for a plurality of target users according to some embodiments of the present disclosure. In some embodiments, process 800 may be executed by the coupon system 100. For example, the process 800 may be implemented as a set of instructions (e.g., an application) stored in a storage device (e.g., the storage device 140, the ROM 230, the RAM 240, the storage 390). In some embodiments, the processing device 112 (e.g., the processor 220 of the computing device 200, the CPU 340 of the mobile device 300, and/or one or more modules illustrated in FIG. 4) may execute the set of instructions and may accordingly be directed to perform the process 800. In some embodiments, one or more operations of the process 800 may be performed to achieve at least part of operation 560 as described in connection with FIG. 5.

In some embodiments, an optimal coupon issuing strategy may be determined according to a genetic algorithm. As described in connection with operation 560, the candidate coupon issuing strategies determined in operation 540 may be used as an initial generation in the genetic algorithm. The ROIs of the candidate coupon issuing strategies may represent the fitness of the candidate coupon issuing strategies. The candidate coupon issuing strategies may evolve (or be updated) to determine the optimal coupon issuing strategy. In some embodiments, the evolution (or update) of the candidate coupon issuing strategies may include one or more iterations. For illustration purposes, a current iteration of the iteration(s) is described in the following description. The current iteration may include one or more operations of the process 800.

In 810, the processing device 112 (e.g., the optimal strategy determination module 460) (e.g., the processing circuits of the processor 220) may determine whether a termination condition is satisfied in the current iteration.

An exemplary termination condition may be that the highest ROI of the candidate coupon issuing strategies in the current iteration exceeds a first threshold. Other exemplary termination conditions may include that a certain count of iterations are performed, that a difference between the highest ROI of the candidate coupon issuing strategies in the current iteration and the highest ROI of the candidate coupon issuing strategies in the previous iteration is below a second threshold, etc.

In response to a determination that the termination condition is satisfied, the process 800 may proceed to 860. In 860, the processing device 112 (e.g., the optimal strategy determination module 460) (e.g., the processing circuits of the processor 220) may designate the candidate coupon issuing strategy with the highest ROI among the candidate coupon issuing strategies in the current iteration as the optimal coupon issuing strategy.

In response to a determination that the termination condition is not satisfied, the process 800 may proceed to operations 820 to 850. In 820, the processing device 112 (e.g., the optimal strategy determination module 460) (e.g., the processing circuits of the processor 220) may update the candidate coupon issuing strategies in the current iteration. In some embodiments, the processing device 112 may update the candidate coupon issuing strategies in the current iteration by applying one or more genetic operators, such as selection, crossover, and/or mutation. By the selection operator, one or more candidate coupon issuing strategies whose ROIs are greater a certain threshold may be selected and directly designated as one or more updated candidate coupon issuing strategies. By the crossover operator, values of a property (e.g., a coupon value, a threshold value) may be exchanged between two or more candidate coupon issuing strategies. For example, a first candidate coupon issuing strategy may correspond to a first grouping strategy whose threshold values relating to the GMV are 30% and 60%. A second candidate coupon issuing strategy may correspond to a second grouping strategy whose threshold values relating to the GMV are 35% and 65%. The crossover operator may be applied by exchanging the threshold values 30% and 35% to generate a third candidate coupon issuing strategy and a fourth candidate coupon issuing strategy, wherein the third candidate coupon issuing strategy may correspond to a third grouping strategy whose threshold values are 35% and 60%, and the fourth candidate coupon issuing strategy may correspond to a fourth grouping strategy whose threshold values are 30% and 65%. By the mutation operator, a value of a property (e.g., a coupon value, a threshold value) of a candidate coupon issuing strategy may be altered. For example, the munition operator may be applied to the first candidate coupon issuing strategy to generate a fifth candidate coupon issuing strategy, which corresponds to a fifth grouping strategy whose threshold values are 45% and 60%.

In 830, for each of the updated candidate coupon issuing strategies in the current iteration, the processing device 112 (e.g., the optimal strategy determination module 460) (e.g., the processing circuits of the processor 220) may determine an updated ROI of the updated candidate coupon issuing strategy. The updated ROI of an updated candidate coupon issuing strategy may be determined in a similar manner as an ROI of a candidate coupon issuing strategy as described in connection with operation 550, and the descriptions thereof are not repeated here.

In 840, the processing device 112 (e.g., the optimal strategy determination module 460) (e.g., the processing circuits of the processor 220) may designate each updated candidate coupon issuing strategy in the current iteration as a candidate coupon issuing strategy in a next iteration.

In 850, the processing device 112 (e.g., the optimal strategy determination module 460) (e.g., the processing circuits of the processor 220) may designate the updated ROI of each updated candidate coupon issuing strategy in the current iteration as an ROI of the corresponding candidate coupon issuing strategy in the next iteration. After operations 820 to 850, the process 800 may proceed to operation 810 again to perform the next iteration until the termination condition is satisfied.

It should be noted that the above description of the process 800 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the operations of the process 800 are intended to be illustrative. The process 800 may be accomplished with one or more additional operations not described and/or without one or more of the operations herein discussed. Additionally, the order in which the operations of the process 800 described above is not intended to be limiting. For example, operations 840 and 850 may be performed simultaneously.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A method for issuing coupons to a plurality of target users, the plurality of target users being registered users of an online service platform, the method being implemented on a computing device of the online service platform, the computing device having at least one processor and at least one storage medium including a set of instructions, and the method comprising:

for each of the plurality of target users, tracking, by the at least one processor, historical consumption data of the target user on the online service platform;

for each of the plurality of target users, determining, by the at least one processor, a predicted value of a group indicator of the target user in a predetermined period based on the historical consumption data of the target user;

grouping, by the at least one processor, the plurality of target users using a plurality of grouping strategies, each grouping strategy being used to group the plurality of target users into a plurality of groups based on the predicted values of the group indicator of the plurality of target users;

for each of the plurality of grouping strategies, determining, by the at least one processor, a candidate coupon issuing strategy, the candidate coupon issuing strategy specifying a coupon value for each group corresponding to the grouping strategy;

for each of the plurality of candidate coupon issuing strategies, obtaining, by the at least one processor, user feature information of one or more target users in each group corresponding to the candidate coupon issuing strategy;

for each of the plurality of candidate coupon issuing strategies, predicting, by the at least one processor and based on a return on investment (ROI) prediction model and the corresponding user feature information, an ROI of the candidate coupon issuing strategy, wherein an input of the ROI prediction model includes the corresponding user feature information;

determining, by the at least one processor and based on the ROIs of the plurality of candidate coupon issuing strategies using a genetic algorithm, an optimal coupon issuing strategy for the plurality of target users, wherein the ROI prediction model is generated by performing an ROI prediction model training process according to a gradient boosting decision tree algorithm, the ROI prediction model training process comprises:

obtaining a plurality of sample coupon issuing strategies;

obtaining sample historical consumption data of a plurality of sample users;

for each of the plurality of sample coupon issuing strategies, determining, among the plurality of sample users, an experimental group and a control group based on the sample historical consumption data of the plurality of sample users;

for each of the plurality of sample coupon issuing strategies, determining an ROI based on the sample historical consumption data of the corresponding experimental group and the sample historical consumption data of the corresponding control group; and generating the ROI prediction model based on the ROI, sample user feature information of the experimental group, and sample user feature information of the control group of each sample coupon issuing strategy.

2. The method of claim 1, wherein the determining a predicted value of a group indicator of each target user in a predetermined period further comprises:

obtaining a group indicator prediction model; and for each target user, determining, based on the group indicator prediction model and the historical consumption data of the target user, the predicted value of the group indicator of the target user in the predetermined period, wherein an input of the group indicator prediction model includes the historical consumption data of the target user.

3. The method of claim 2, wherein the group indicator prediction model is generated according to a group indicator prediction model training process, and the group indicator prediction model training process comprises:

for a plurality of second sample users, obtaining sample historical consumption data of each second sample user in a first historical period and a value of the group indicator of each second sample user in a second historical period; and generating, based on the sample historical consumption data and the values of the group indicator of the plurality of second sample users, the group indicator prediction model.

4. The method of claim 1, wherein the group indicator is at least one of a gross merchandise volume (GMV), a coupon conversion rate, or an abandon rate of coupons.

5. The method of claim 1, wherein the determining an optimal coupon issuing strategy for the plurality of target users comprises one or more iterations, and each current iteration of the one or more iteration comprises:

determining whether a termination condition is satisfied in the current iteration;

in response to a determination that the termination condition is unsatisfied in the current iteration, updating the plurality of candidate coupon issuing strategies;

for each of the updated candidate coupon issuing strategies in the current iteration, determining an updated ROI;

designating each updated candidate coupon issuing strategy in the current iteration as a candidate coupon issuing strategy in a next iteration; and designating the updated ROI of each updated candidate coupon issuing strategy in the current iteration as an ROI of the corresponding candidate coupon issuing strategy in the next iteration.

6. The method of claim 5, wherein each current iteration of the one or more iterations further comprises:

in response to a determination that the termination condition is satisfied in the current iteration, designating the candidate coupon issuing strategy with the highest ROI among the plurality of candidate coupon issuing strategies in the current iteration as the optimal coupon issuing strategy.

7. A system for issuing coupons to a plurality of target users, the plurality of target users being registered users of an online service platform, comprising:

at least one storage medium including a set of instructions; and at least one processor in communication with the at least one storage medium, wherein when executing the instructions, the at least one processor is configured to direct the system to perform operations including:

for each of the plurality of target users, tracking, by the at least one processor, historical consumption data of the target user on the online service platform;

for each of the plurality of target users, determining, by the at least one processor, a predicted value of a group indicator of the target user in a predetermined period based on the historical consumption data of the target user;

grouping, by the at least one processor, the plurality of target users using a plurality of grouping strategies, each grouping strategy being used to group the plurality of target users into a plurality of groups based on the predicted values of the group indicator of the plurality of target users;

for each of the plurality of grouping strategies, determining, by the at least one processor, a candidate coupon issuing strategy, the candidate coupon issuing strategy specifying a coupon value for each group corresponding to the grouping strategy;

for each of the plurality of candidate coupon issuing strategies, obtaining, by the at least one processor, user feature information of one or more target users in each group corresponding to the candidate coupon issuing strategy;

for each of the plurality of candidate coupon issuing strategies, predicting, by the at least one processor, based on a return on investment (ROI) prediction model and the corresponding user feature information, an ROI of the candidate coupon issuing strategy, wherein an input of the ROI prediction model includes the corresponding user feature information;

determining, by the at least one processor, based on the ROIs of the plurality of candidate coupon issuing strategies using a genetic algorithm, an optimal coupon issuing strategy for the plurality of target users, wherein the ROI prediction model is generated by performing an ROI prediction model training process according to a gradient boosting decision tree algorithm, the ROI prediction model training process comprises:

obtaining a plurality of sample coupon issuing strategies;

obtaining sample historical consumption data of a plurality of sample users;

for each of the plurality of sample coupon issuing strategies, determining, among the plurality of sample users, an experimental group and a control group based on the sample historical consumption data of the plurality of sample users;

for each of the plurality of sample coupon issuing strategies, determining an ROI based on the sample historical consumption data of the corresponding experimental group and the sample historical consumption data of the corresponding control group; and generating the ROI prediction model based on the ROI, sample user feature information of the experimental group, and sample user feature information of the control group of each sample coupon issuing strategy.

8. The system of claim 7, wherein to determine a predicted value of a group indicator of each target user in a predetermined period, the at least one processor is further configured to direct the system to perform additional operations including:

obtaining a group indicator prediction model; and for each target user, determining, based on the group indicator prediction model and the historical consumption data of the target user, the predicted value of the group indicator of the target user in the predetermined period, wherein an input of the group indicator prediction model includes the historical consumption data of the target user.

9. The system of claim 7, wherein the group indicator prediction model is generated according to a group indicator prediction model training process, the group indicator prediction model training process comprises:

for a plurality of second sample users, obtaining sample historical consumption data of each second sample user in a first historical period and a value of the group indicator of each second sample user in a second historical period; and generating, based on the sample historical consumption data and the values of the group indicator of the plurality of second sample users, the group indicator prediction model.

10. The system of claim 7, wherein the group indicator is at least one of a gross merchandise volume (GMV), a coupon conversion rate, or an abandon rate of coupons.

11. The system of claim 7, wherein the determining an optimal coupon issuing strategy for the plurality of target users comprises one or more iterations, and each current iteration of the one or more iteration comprises:
    determining whether a termination condition is satisfied in the current iteration;
    in response to a determination that the termination condition is unsatisfied in the current iteration, updating the plurality of candidate coupon issuing strategies;
    for each of the updated candidate coupon issuing strategies in the current iteration, determining an updated ROI;
    designating each updated candidate coupon issuing strategy in the current iteration as a candidate coupon issuing strategy in a next iteration; and
    designating the updated ROI of each updated candidate coupon issuing strategy in the current iteration as an ROI of the corresponding candidate coupon issuing strategy in the next iteration.

12. The system of claim 11, wherein each current iteration of the one or more iterations further comprises:
    in response to a determination that the termination condition is satisfied in the current iteration, designating the candidate coupon issuing strategy with the highest ROI among the plurality of candidate coupon issuing strategies in the current iteration as the optimal coupon issuing strategy.

13. A non-transitory computer-readable storage medium embodying a computer program product, the computer program product comprising instructions for issuing coupons to a plurality of target users, the plurality of target users being registered users of an online service platform, and configured to cause a computing device to:
    for each of the plurality of target users, track, by the at least one processor, historical consumption data of the target user on the online service platform;
    for each of the plurality of target users, determine, by the at least one processor, a predicted value of a group indicator of the target user in a predetermined period based on the historical consumption data of the target user;
    group, by the at least one processor, the plurality of target users using a plurality of grouping strategies, each grouping strategy being used to group the plurality of target users into a plurality of groups based on the predicted values of the group indicator of the plurality of target users;
    for each of the plurality of grouping strategies, determine, by the at least one processor, a candidate coupon issuing strategy, the candidate coupon issuing strategy specifying a coupon value for each group corresponding to the grouping strategy;
    for each of the plurality of candidate coupon issuing strategies, obtain, by the at least one processor, user feature information of one or more target users in each group corresponding to the candidate coupon issuing strategy;
    for each of the plurality of candidate coupon issuing strategies, determine, by the at least one processor, based on a return on investment (ROI) prediction model and the corresponding user feature information, an ROI of the candidate coupon issuing strategy, wherein an input of the ROI prediction model includes the corresponding user feature information;
    determine, by the at least one processor, based on the ROIs of the plurality of candidate coupon issuing strategies using a genetic algorithm, an optimal coupon issuing strategy for the plurality of target users, wherein the ROI prediction model is generated by performing an ROI prediction model training process according to a gradient boosting decision tree algorithm, the ROI prediction model training process comprises:
        obtaining a plurality of sample coupon issuing strategies;
        obtaining sample historical consumption data of a plurality of sample users;
        for each of the plurality of sample coupon issuing strategies, determining, among the plurality of sample users, an experimental group and a control group based on the sample historical consumption data of the plurality of sample users;
        for each of the plurality of sample coupon issuing strategies, determining an ROI based on the sample historical consumption data of the corresponding experimental group and the sample historical consumption data of the corresponding control group; and
        generating the ROI prediction model based on the ROI, sample user feature information of the experimental group, and sample user feature information of the control group of each sample coupon issuing strategy.

14. The non-transitory computer-readable storage medium of claim 13, wherein to determine a predicted value of a group indicator of each target user in a predetermined period, the computer program product is further configured to cause the computing device to:
    obtain a group indicator prediction model; and
    for each target user, determine, based on the group indicator prediction model and the historical consumption data of the target user, the predicted value of the group indicator of the target user in the predetermined period, wherein an input of the group indicator prediction model includes the historical consumption data of the target user.

15. The non-transitory computer-readable storage medium of claim 14, wherein to the group indicator prediction model is generated according to a group indicator prediction model training process, the group indicator prediction model training process comprises:
    for a plurality of second sample users, obtaining sample historical consumption data of each second sample user in a first historical period and a value of the group indicator of each second sample user in a second historical period; and
    generating, based on the sample historical consumption data and the values of the group indicator of the plurality of second sample users, the group indicator prediction model.

\* \* \* \* \*